US009399949B2

(12) United States Patent
Okamura et al.

(10) Patent No.: US 9,399,949 B2
(45) Date of Patent: Jul. 26, 2016

(54) TURBINE

(71) Applicant: Kabushiki Kaisha Toshiba, Tokyo (JP)

(72) Inventors: Naoyuki Okamura, Yokohama (JP); Nobuhiro Okizono, Yokohama (JP); Iwataro Sato, Hiratsuka (JP); Kazutaka Tsuruta, Yokohama (JP); Akihiro Onoda, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 677 days.

(21) Appl. No.: 13/778,577

(22) Filed: Feb. 27, 2013

(65) Prior Publication Data

US 2014/0020402 A1    Jan. 23, 2014

(30) Foreign Application Priority Data

Jul. 20, 2012  (JP) .................................. 2012-162098

(51) Int. Cl.
*F02C 3/00* (2006.01)
*F02C 7/18* (2006.01)
(Continued)

(52) U.S. Cl.
CPC . *F02C 3/00* (2013.01); *F01D 25/12* (2013.01); *F02C 3/34* (2013.01); *F02C 7/10* (2013.01); *F02C 7/18* (2013.01); *F05D 2210/12* (2013.01)

(58) Field of Classification Search
CPC ................ F02C 3/00; F02C 3/34; F02C 7/10; F02C 7/18; F01D 25/12; F05D 2210/12
USPC ........................ 60/806, 39.5, 39.182; 415/115
See application file for complete search history.

(56) References Cited

U.S. PATENT DOCUMENTS 4,721,433 A * 1/1988 Piendel ................... F01D 25/14
                                                            415/115
5,088,888 A * 2/1992 Bobo ..................... F01D 11/005
                                                            415/170.1
(Continued)

FOREIGN PATENT DOCUMENTS

EP    1 249 592 A2    10/2002
JP    9-060531           3/1997
(Continued)

OTHER PUBLICATIONS

Office Action dated Oct. 6, 2015, in Japanese Patent Application No. 2012-162098, filed Jul. 20, 2012, (with English-language Translation).

(Continued)

*Primary Examiner* — Ted Kim
(74) *Attorney, Agent, or Firm* — Oblon, McClelland, Maier & Neustadt, L.L.P

(57) ABSTRACT

In one embodiment, a turbine using $CO_2$ includes moving blades, stator blades, a working fluid transport flow path, a coolant transport flow path, and a coolant recovery flow path. The stator blades constitute turbine stages together with the moving blades. The working fluid transport flow path is configured to transport the working fluid sequentially to the turbine stages. The coolant transport flow path is configured to transport the coolant by allowing the coolant to sequentially pass through the inside of the stator blades from an upstream to a downstream of the working fluid. The coolant recovery flow path is configured to recover the coolant passing through the inside of the stator blade at a predetermined turbine stage and merge the recovered coolant with the working fluid transport flow path at a turbine stage on an upstream side of the predetermined turbine stage.

1 Claim, 9 Drawing Sheets

(51) Int. Cl.
  *F02C 3/34* (2006.01)
  *F01D 25/12* (2006.01)
  *F02C 7/10* (2006.01)

(56) References Cited

U.S. PATENT DOCUMENTS

| | | | |
|---|---|---|---|
| 5,217,347 A * | 6/1993 | Miraucourt | F01D 5/187 |
| | | | 415/115 |
| 5,640,840 A | 6/1997 | Briesch | |
| 5,782,076 A | 7/1998 | Huber et al. | |
| 5,953,900 A | 9/1999 | Bannister et al. | |
| 5,980,201 A * | 11/1999 | Benoist | F01D 25/14 |
| | | | 415/115 |
| 6,269,624 B1 * | 8/2001 | Frutschi | F02C 3/34 |
| | | | 60/39.52 |
| 6,340,285 B1 * | 1/2002 | Gonyou | F01D 11/005 |
| | | | 415/116 |
| 6,612,806 B1 * | 9/2003 | Bolms | F01D 25/12 |
| | | | 415/115 |
| 8,585,357 B2 * | 11/2013 | DiPaola | F01D 9/04 |
| | | | 415/173.6 |
| 2002/0150467 A1 | 10/2002 | Tanioka | |
| 2010/0071878 A1 | 3/2010 | Gilchrist, III et al. | |
| 2012/0067054 A1 | 3/2012 | Palmer et al. | |
| 2013/0186101 A1 * | 7/2013 | Mundra | F02C 7/18 |
| | | | 60/785 |
| 2014/0331687 A1 | 11/2014 | Palmer et al. | |

FOREIGN PATENT DOCUMENTS

| | | |
|---|---|---|
| JP | 2000-511261 | 8/2000 |
| JP | 2011-32954 | 2/2011 |
| WO | WO 96/18810 A1 | 6/1996 |
| WO | WO 98/12421 A1 | 3/1998 |
| WO | WO 2012/040214 | 3/2012 |

OTHER PUBLICATIONS

Extended European Search Report issued Sep. 18, 2014 in Patent Application No. 13158939.2.

* cited by examiner

SECTION ALONG A-A

SECTION ALONG B-B

SECTION ALONG C-C

SECTION
ALONG D-D

TURBINE

CROSS REFERENCE TO RELATED APPLICATION

This application is based upon and claims the benefit of priority from Japanese Patent Application No. 2012-162098, filed on Jul. 20, 2012; the entire contents of which are incorporated herein by reference.

FIELD

Embodiments described herein relate generally to a turbine.

BACKGROUND

In a conventional power generation plant, a gas turbine, a steam turbine and so on are used as a power source for power generation.

To obtain much motive force from the turbine, a turbine of specifications of employing working fluid at a temperature equal to or higher than the heat proof temperature of turbine blades has also been developed. In this kind of turbine, for example, coolant is injected and is made to pass through the inside of the turbine blades to cool the turbine blades.

The turbine of the specifications is also constantly required to improve the energy efficiency.

DETAILED DESCRIPTION

In one embodiment, a turbine using $CO_2$ as working fluid and coolant including a rotor, a plurality of moving blades, a plurality of stator blades, a working fluid transport flow path, a coolant transport flow path, and a coolant recovery flow path. The plurality of moving blades are arranged along an axis of the rotor. The plurality of stator blades constitute a plurality of turbine stages together with the plurality of moving blades. The working fluid transport flow path is configured to transport the working fluid sequentially to the plurality of turbine stages. The coolant transport flow path is configured to transport the coolant by allowing the coolant to sequentially pass through the inside of the plurality of stator blades from an upstream to a downstream of the working fluid. The coolant recovery flow path is configured to recover the coolant passing through the inside of the stator blade at a predetermined turbine stage and merge the recovered coolant with the working fluid transport flow path at a turbine stage on an upstream side of the predetermined turbine stage.

Hereinafter, embodiments will be described based on the drawings.

First Embodiment

Figure 1:
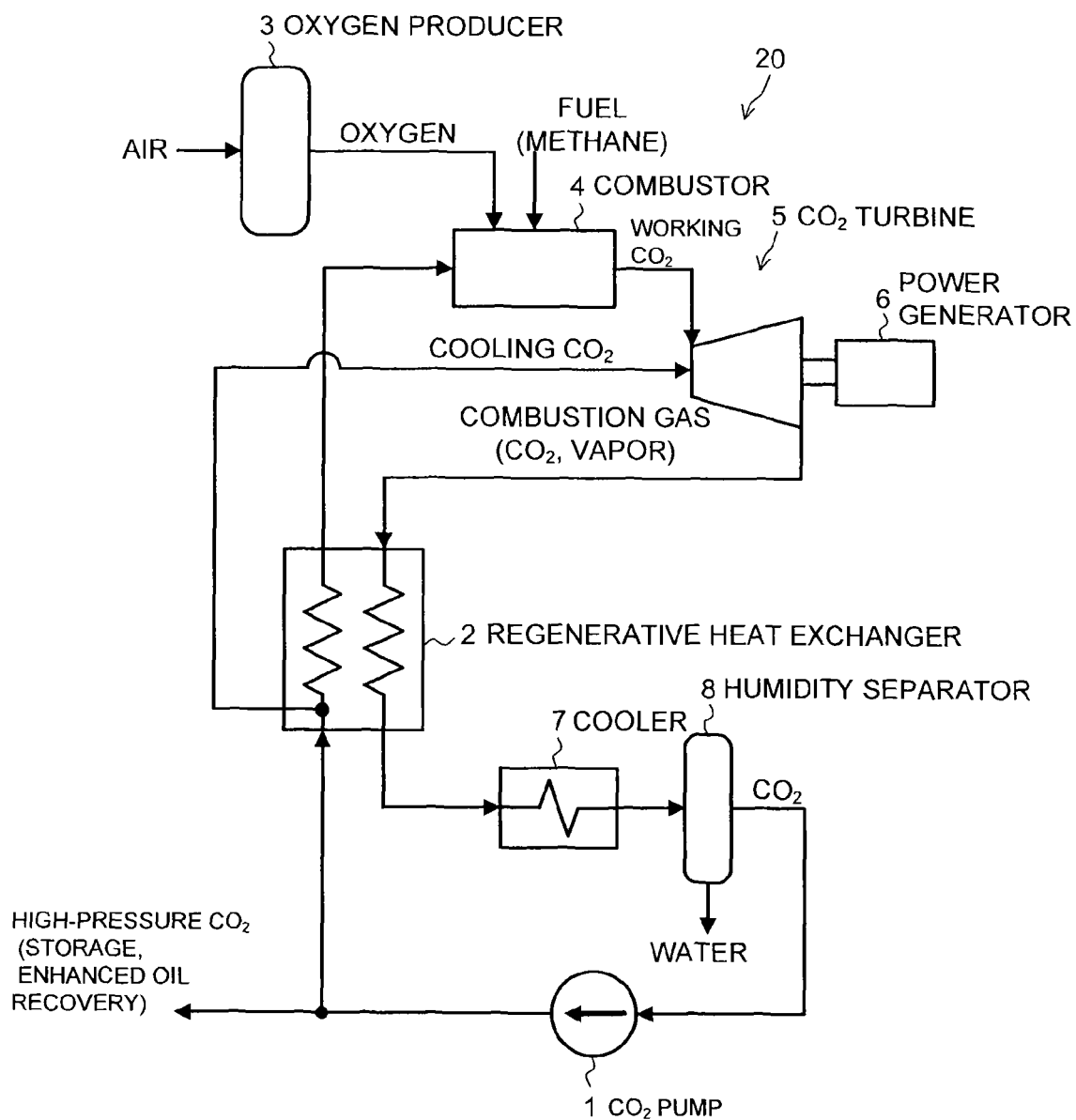
FIG. 1 is a block diagram of a thermal power generation system including a $CO_2$ turbine according to a first embodiment.

As illustrated in FIG. 1, a thermal power generation system 20 according to this embodiment includes a $CO_2$ turbine 5, a $CO_2$ pump 1, a regenerative heat exchanger 2, an oxygen producer 3, a combustor 4, a power generator 6, a cooler 7, a humidity separator 8 and so on.

The $CO_2$ pump 1 compresses highly-pure $CO_2$ made by separating water from a combustion gas ($CO_2$ and vapor) by the humidity separator 8, and supplies the $CO_2$ at high pressure to the combustor 4 and the $CO_2$ turbine 5 in a branching manner through the regenerative heat exchanger 2.

Note that the highly-pure $CO_2$ at higher pressure generated in the $CO_2$ pump 1 may be stored or utilized for enhanced oil recovery. In short, the one $CO_2$ pump 1 doubles as supply sources for working $CO_2$ and cooling $CO_2$. The working $CO_2$ may be called working gas or working fluid, and the cooling $CO_2$ may be called cooling gas, cooling fluid, or coolant.

The regenerative heat exchanger 2 supplies $CO_2$ increased in temperature by heat exchange to the combustor 4. The regenerative heat exchanger 2 supplies part of $CO_2$ to the $CO_2$ turbine 5 before complete heat exchange. $CO_2$ supplied to the combustor 4 is for working. $CO_2$ supplied to the $CO_2$ turbine 5 is for cooling or sealing. Further, the regenerative heat exchanger 2 cools through heat exchange the combustion gas ($CO_2$ and vapor) exhausted from the $CO_2$ turbine 5.

The oxygen producer 3 produces oxygen and supplies the produced oxygen to the combustor 4. The combustor 4 combusts injected natural gas such as methane gas, $CO_2$ and oxygen to generate combustion gas ($CO_2$ and vapor) at high temperature and high pressure, and supplies the combustion gas to the $CO_2$ turbine 5 as the working $CO_2$.

The $CO_2$ turbine 5 is driven by the working $CO_2$ at high temperature and high pressure. The $CO_2$ turbine 5 rotates moving blades 13 in the turbine and a turbine rotor 11 supporting the moving blades 13, and transmits their rotation force to the power generator 6. The turbine rotor 11 is also called an axle.

In other words, the $CO_2$ turbine 5 uses $CO_2$ supplied from the one $CO_2$ pump 1 mainly as the working fluid for rotating the turbine rotor 11 and the coolant (fluid for cooling).

The power generator 6 generates power using the rotation force of the turbine rotor 11 of the $CO_2$ turbine 5. A combination of the $CO_2$ turbine 5 and the power generator 6 may be sometimes called a $CO_2$ turbine power generator. The cooler 7 further cools the combustion gas ($CO_2$ and vapor) passed through the regenerative heat exchanger 2, and supplies the cooled combustion gas to the humidity separator 8.

The humidity separator 8 separates water from the combustion gas ($CO_2$ and vapor) at low temperature outputted from the cooler 7 to generate highly-pure $CO_2$, and returns the highly-pure $CO_2$ back to the $CO_2$ pump 1.

The thermal power generation system 20 is constituted by a circulation system of oxygen combustion using $CO_2$ at supercritical pressure and is a zero mission power generation system which is capable of effectively utilizing $CO_2$ without exhausting $CO_2$. Use of this system makes it possible to recover and recycle the highly-pure $CO_2$ at high pressure without separately installing facilities for separating and recovering $CO_2$.

Hereinafter, the operation of the thermal power generation system 20 according to this embodiment will be described. In the case of this embodiment, power is generated by rotating (the moving blades of) the $CO_2$ turbine 5 by the $CO_2$ at high temperature (working $CO_2$) generated by injecting and combusting $CO_2$, natural gas and oxygen.

Then, the combustion gas ($CO_2$ and vapor) exhausted from the $CO_2$ turbine 5 is cooled through the regenerative heat exchanger 2 and the cooler 7 and has water therein separated in the humidity separator 8 into $CO_2$ gas. The $CO_2$ gas is then circulated back to the $CO_2$ pump 1 and compressed, and most of $CO_2$ is fed back to the combustor 4.

Figure 2:
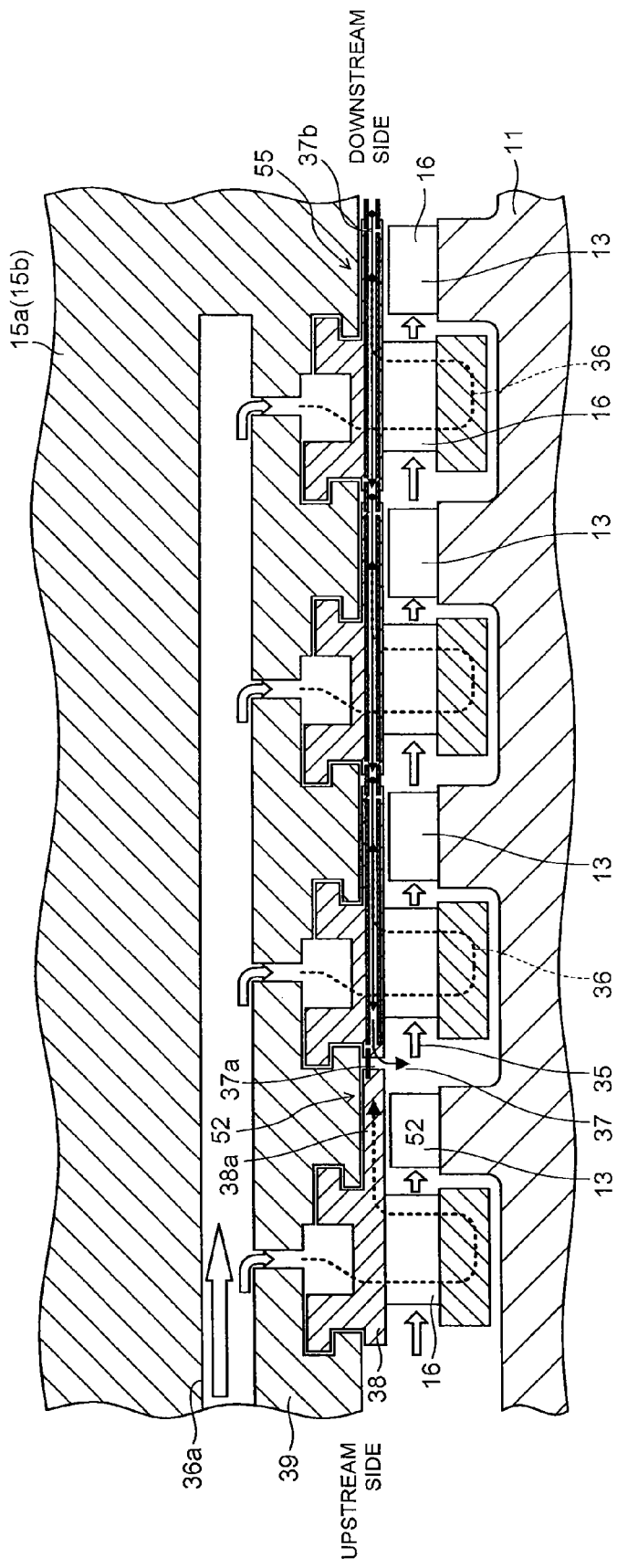
FIG. 2 is a sectional view illustrating a structure at the periphery of a coolant recovery flow path included in the $CO_2$ turbine in FIG. 1.

Next, the structure of a coolant recovery flaw path 37 provided in the $CO_2$ turbine 5 in this embodiment will be described based on FIG. 2 to FIG. 8. As illustrated in FIG. 2, a working fluid transport flow path 35 and a coolant transport flow path 36 are provided around the coolant recovery flow path 37.

The working fluid transport flow path 35 transports the working fluid (working $CO_2$) from its upstream side (high pressure side) to its downstream side (low pressure side) with respect to a plurality of turbine stages each composed of a set of a nozzle (stator blade) 16 and the moving blade 13.

Figure 3:
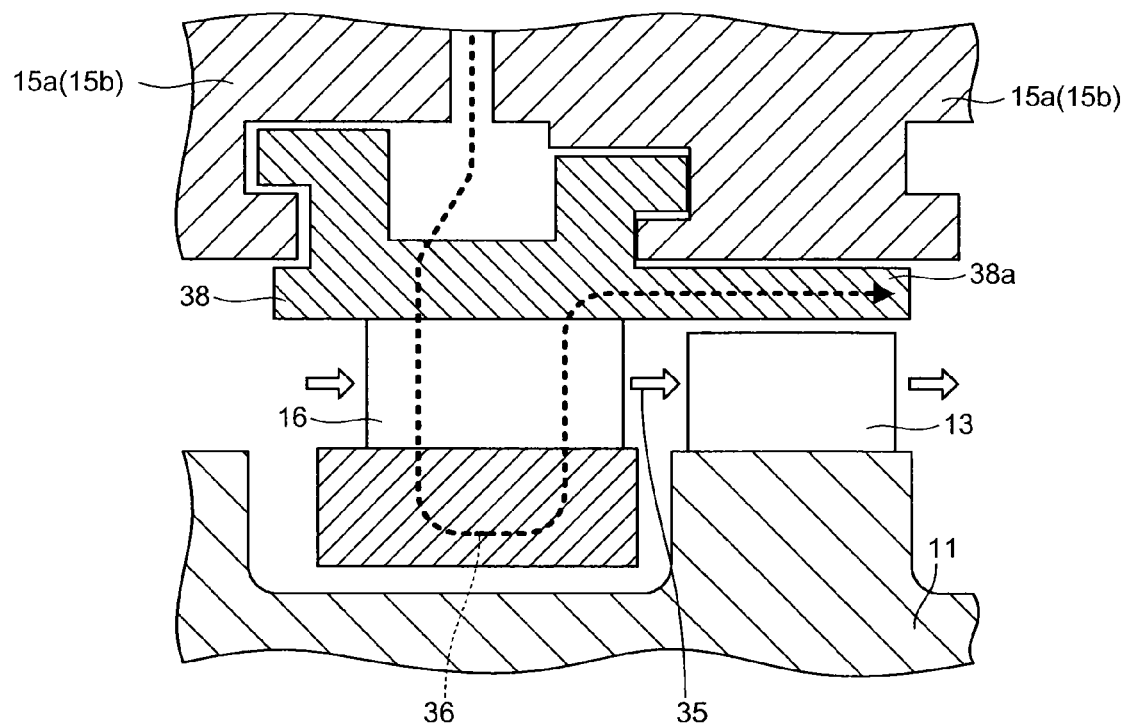
FIG. 3 is an enlarged sectional view illustrating a structure at the periphery of a nozzle in FIG. 2.

As illustrated in FIG. 2 and FIG. 3, each nozzle 16 described above is held by a nozzle segment 38 being a holding member. Further, the nozzle segment 38 holding the nozzle 16 is fixed to a hook part formed in an inner casing 15a (15b).

The coolant transport flow path 36 transports the coolant (cooling $CO_2$) from the upstream side to the downstream side while allowing the coolant (cooling $CO_2$) to pass through the inside of the nozzle 16 at each turbine stage. More specifically, the coolant transport flow path 36 has a major flow path 36a as illustrated in FIG. 2. The major flow path 36a extends from the upstream side to the downstream side inside a member of a main body of the inner casing 15a (15b). In the coolant transport flow path 36, a flow path branches off for each turbine stage from the major flow path 36a and is guided to the inside of the nozzle 16 in each turbine stage.

Figure 4:
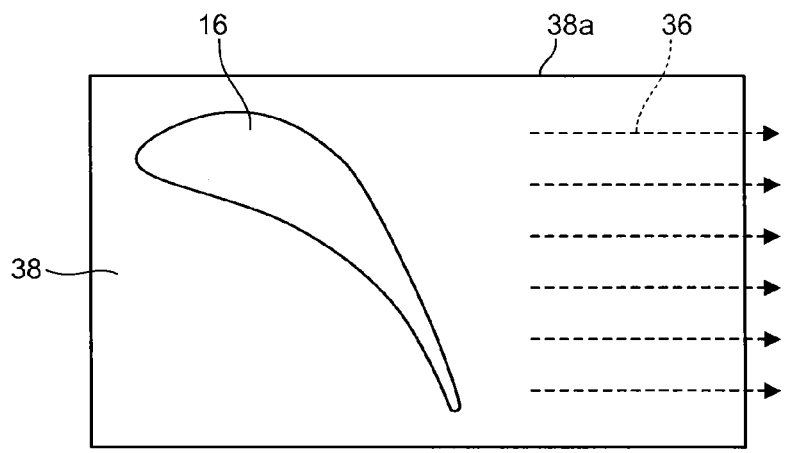
FIG. 4 is a view schematically illustrating the periphery of the nozzle in FIG. 3 in a state seen from a direction of a diameter of a rotor.
Figure 5:
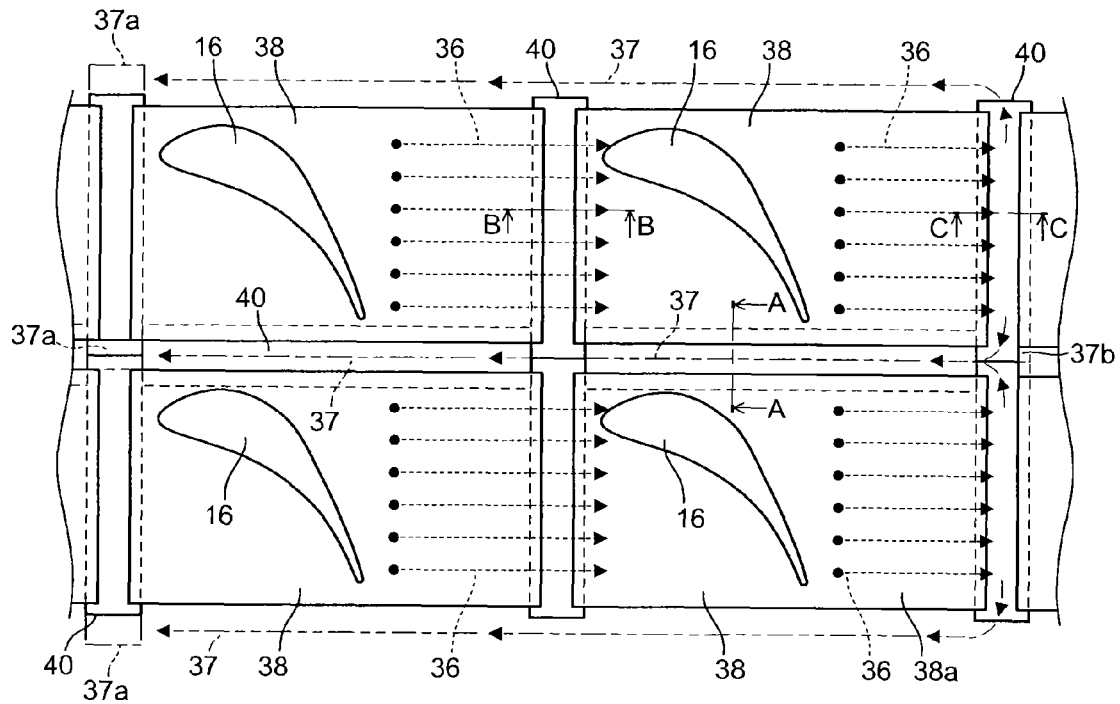
FIG. 5 is a view for explaining the flow of coolant at the periphery of the nozzle in FIG. 2.
Figure 6:
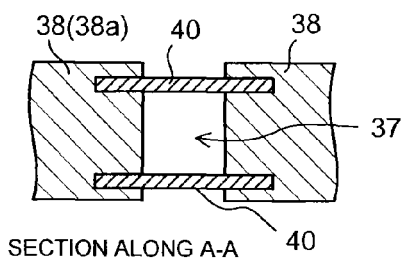
FIG. 6 is a sectional view along A-A in FIG. 5.
Figure 7:
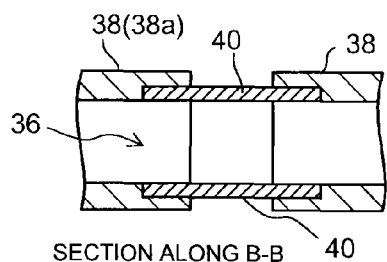
FIG. 7 is a sectional view along B-B in FIG. 5.
Figure 8:
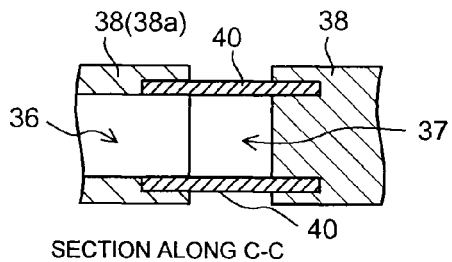
FIG. 8 is a sectional view along C-C in FIG. 5.

Further, the coolant transport flow path 36 passes through the inside of the nozzle 16 and then goes through the inside of a nozzle side wall 38a of the nozzle segment 38 to the outside of the main body of the nozzle segment 38 for discharge as illustrated in FIG. 3 to FIG. 5. Here, to obtain more motive power, working fluid (working $CO_2$), for example, at a temperature equal to or higher than a heat proof temperature of the nozzle 16 needs to be injected into the $CO_2$ turbine 5 in some case. For this reason, the coolant transport flow path 36 needs to cool the nozzle 16.

On the other hand, the coolant recovery flaw path 37 recovers the coolant passing through the inside of the nozzle 16 at a predetermined turbine stage along the coolant transport flow path 36. The coolant recovery flaw path 37 merges the recovered coolant with the working fluid transport flow path 35 at a turbine stage on the upstream side of the predetermined turbine stage. Specifically, the coolant recovery flaw path 37 is composed of seal plates 40 as seal members and the nozzle segments 38 in combination as illustrated in FIG. 5 to FIG. 8. The seal plates 40 seal the gap between the segments 38 from predetermined directions. The coolant recovery flaw path 37 goes through a space (cavity/clearance) surrounded by the nozzle segments 38 and the seal plates 40.

In more detail, a set of seal plates 40 are arranged opposite each other with a gap intervening therebetween in a gap between end faces opposite each other of a set of nozzle segments 38 to constitute the coolant transport flow path 36 and the coolant recovery flaw path 37 as illustrated in FIG. 5 to FIG. 8. Further, a stopper part 37b and so on are arranged at a boundary portion where the coolant transport flow path 36 switches to the coolant recovery flaw path 37 as illustrated in FIG. 5 (and FIG. 2). Further, a coolant merging hole 37a is provided at a portion of the coolant recovery flaw path 37 merging with the working fluid transport flow path 35 as illustrated in FIG. 5 (and FIG. 2).

Here, the $CO_2$ turbine 5 in this embodiment recovers the coolant passing through the nozzle 16, for example, at a fifth turbine stage (predetermined turbine stage) 55 and merges the recovered coolant with the working fluid transport flow path 35 on the upstream side of the fifth turbine stage (for example, on the downstream side of a second turbine stage 52) as illustrated in FIG. 2. Here, the pressure of the coolant with pressure loss due to cooling of the nozzle balances with the pressure inside the working fluid transport flow path 35, on the downstream side of the second turbine stage 52.

More specifically, the coolant is not simply transported to a further downstream side of the above-described fifth turbine stage (predetermined turbine stage) 55 but the coolant with a sufficient working pressure is merged with the working fluid transport flow path 35 from an appropriate turbine stage. As a result of this, the merged coolant can be made to serve as the working fluid.

As has been described, according to the $CO_2$ turbine 5 in this embodiment, the enthalpy loss (energy loss) of the coolant (cooling $CO_2$) is suppressed (the pressure of the coolant is effectively utilized). As a result of this, the energy efficiency can be increased.

Second Embodiment

Next, a second embodiment will be described based on FIG. 9 to FIG. 12. Note that the same components in these drawings as those in the first embodiment illustrated in FIG. 1 to FIG. 8 are denoted by the same numerals, and duplicating descriptions are omitted.

A $CO_2$ turbine in this embodiment includes a coolant recovery flow path 47 in place of the coolant recovery flow path 37 in the first embodiment as illustrated in FIG. 9 to FIG. 12. The coolant recovery flow path 47 includes a collection flow path 37c. The collection flow path 37c collects coolant respectively recovered at a predetermined turbine stage (for example, a third turbine stage 53) and turbine stages (for example, fourth and fifth turbine stages 54, 55) on the downstream side of the predetermined turbine stage. The collection flow path 37c transports the collected coolant toward a turbine stage (for example, the downstream side of a second turbine state 52) on the upstream side of the predetermined turbine stage.

Figure 12:
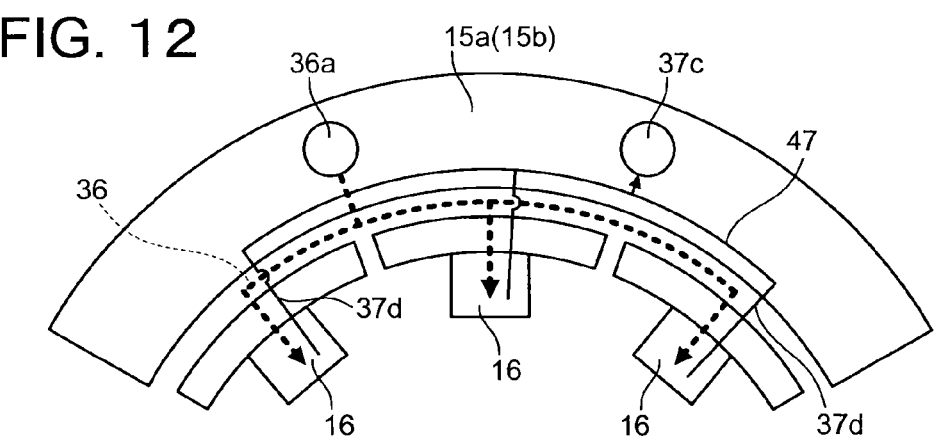
FIG. 12 is a sectional view of the structure at the periphery of the coolant recovery flow path in FIG. 9 as seen in a direction of an axis of a rotor.

Further, the collection flow path 37c included in the coolant recovery flow path 47 passes through (goes through) the inside of a member of an inner casing 15a (15b) as illustrated in FIG. 12. Note that the collection flow path 37c is provided at a position where it does not physically overlap with a major flow path 36a of a coolant transport flow path 36 inside the member of the inner casing 15a (15b).

Figure 9:
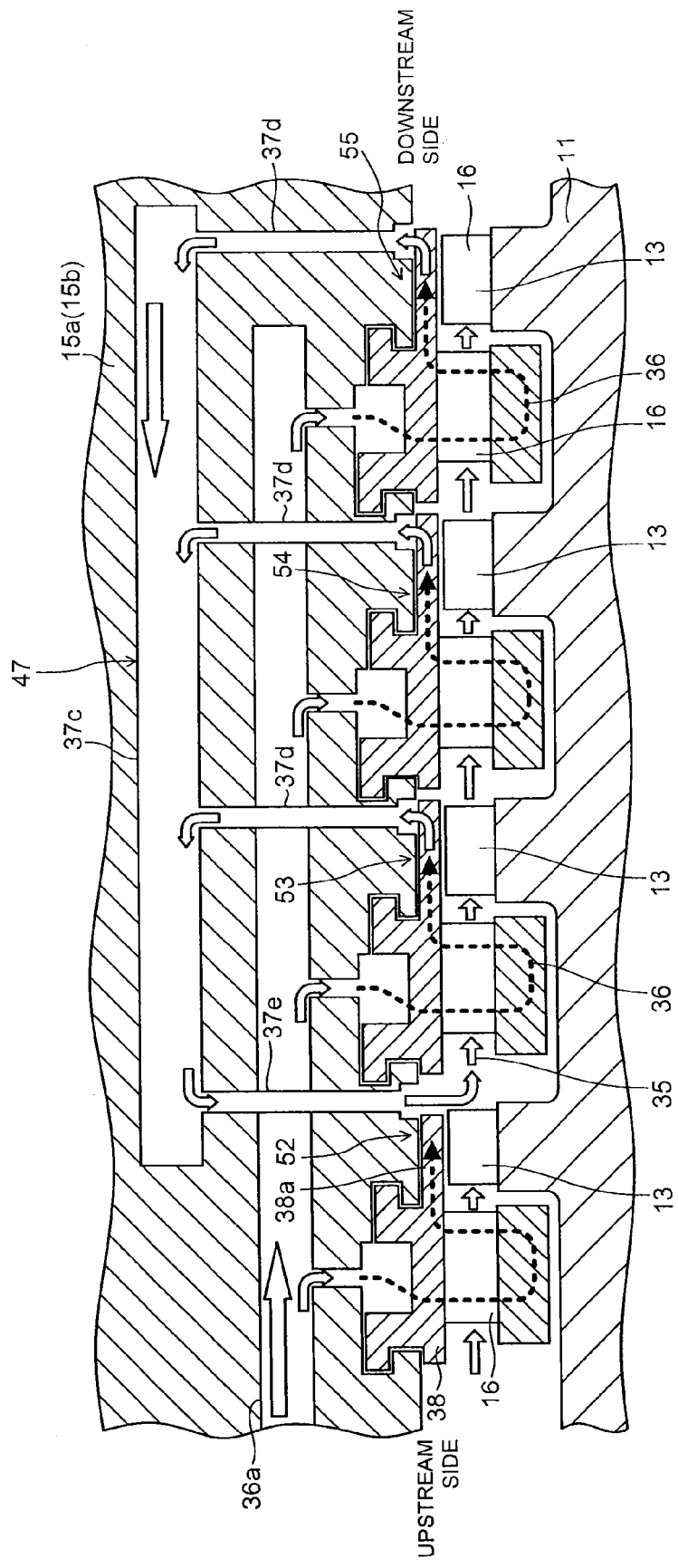
FIG. 9 is a sectional view illustrating a structure at the periphery of a coolant recovery flow path of a $CO_2$ turbine according to a second embodiment.
Figure 10:
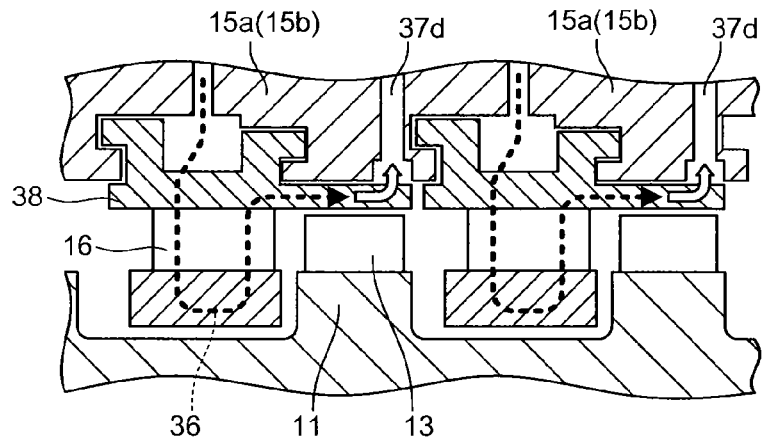
FIG. 10 is a sectional view for explaining in detail the coolant recovery flow path illustrated in FIG. 9.
Figure 11:
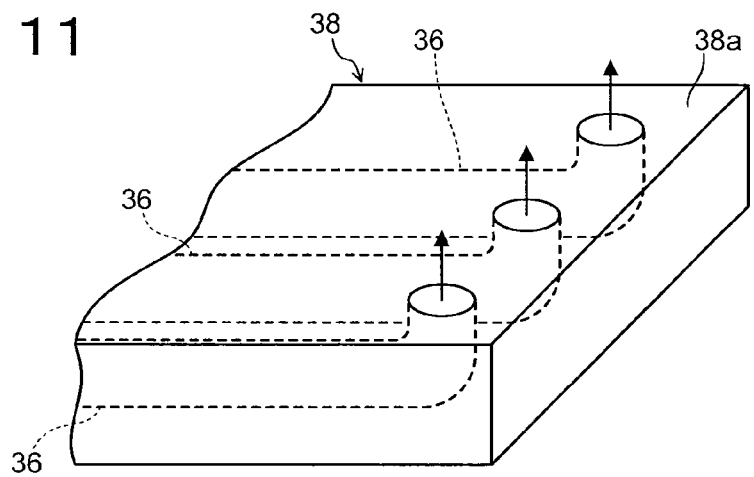
FIG. 11 is a perspective view illustrating a structure of a part of the coolant recovery flow path provided in a nozzle segment included in the $CO_2$ turbine in FIG. 9.

In more detail, the coolant recovery flow path 47 further includes a relay flow path 37d and a supply flow path 37e as illustrated in FIG. 9. The relay flow path 37d transports the coolant recovered from the turbine stages to the collection flow path 37c. The supply flow path 37e supplies the coolant from the collection flow path 37c to a working fluid transport flow path 35.

According to the $CO_2$ turbine in the second embodiment configured as described above, it is possible to recover the coolant (the coolant with less pressure loss due to nozzle cooling) also from a turbine stage closer to the turbine stage with which the coolant is merged and cause the coolant to function as the working fluid. Therefore, the energy efficiency can further be increased.

Third Embodiment

Figure 13:
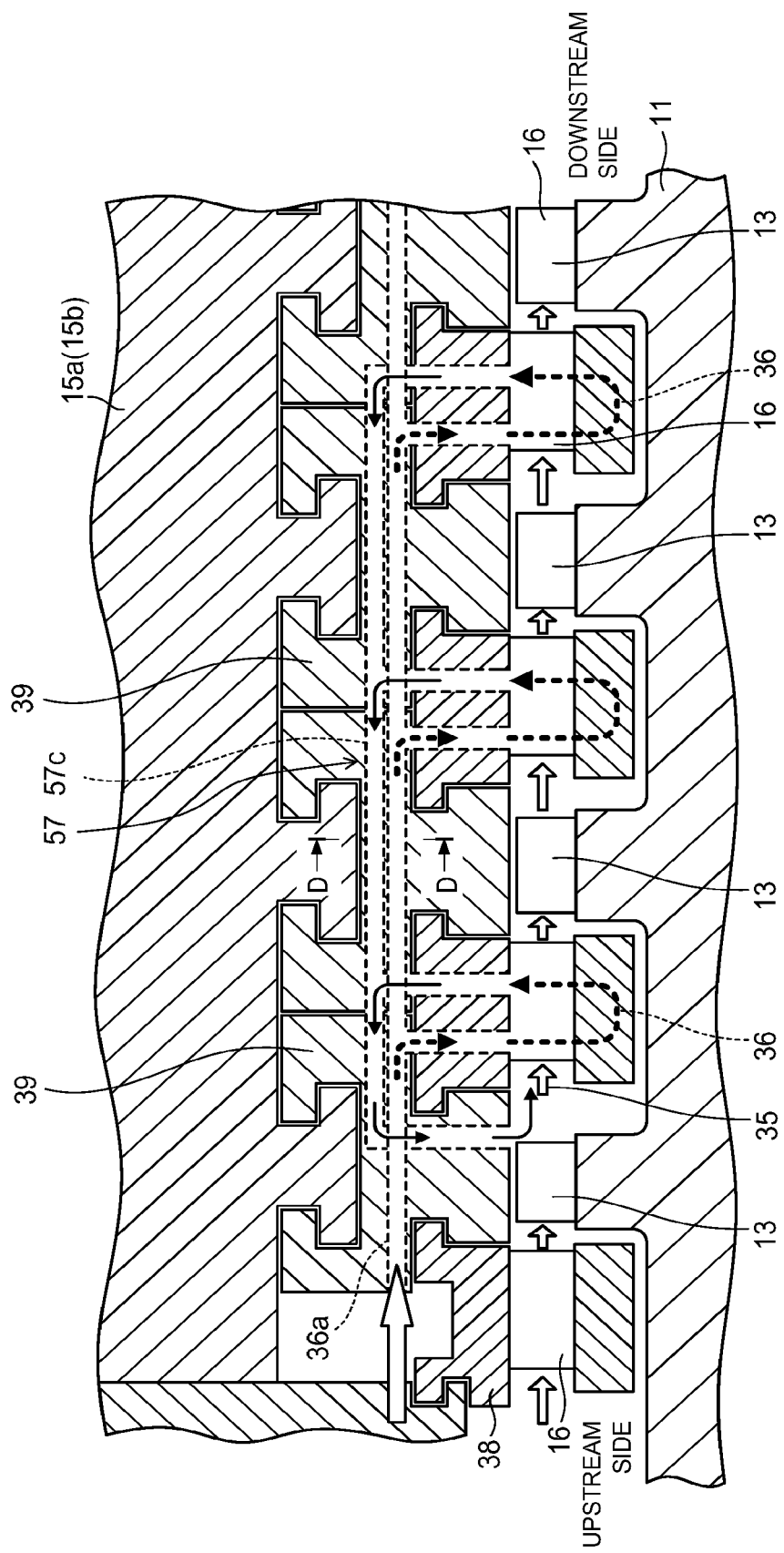
FIG. 13 is a sectional view illustrating a structure at the periphery of a coolant recovery flow path of a $CO_2$ turbine according to a third embodiment.
Figure 14:
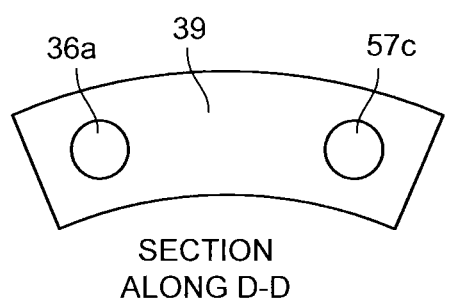
FIG. 14 is a sectional view along D-D in FIG. 13.

Next, a third embodiment will be described based on FIG. 13 and FIG. 14. Note that the same components in these drawings as those in the first and second embodiments illustrated in FIG. 1 to FIG. 12 are denoted by the same numerals, and duplicating descriptions are omitted.

A $CO_2$ turbine in this embodiment includes a coolant recovery flow path 57 in place of the coolant recovery flow path 47 in the second embodiment. As illustrated in FIG. 13 and FIG. 14, the coolant recovery flow path 57 includes a collection flow path 57c in place of the collection flow path 37c in the second embodiment. The collection flow path 57c passes through (goes through) the inside (member inside) of a plurality of shroud segments 39.

Note that in the $CO_2$ turbine in this embodiment, a major flow path 36a of a coolant transport flow path 36 is provided also inside the shroud segment 39. In other words, the collection flow path 57c is arranged at a position where it does not physically overlap with the major flow path 36a inside the shroud segment 39.

According to the $CO_2$ turbine in this embodiment, it is possible to process and form the collection flow path while it is divided into a plurality of shroud segments, unlike the case where the collection flow path is processed and formed in the casing. Therefore, it is possible in this embodiment to increase the processability of the collection flow path in addition to the effects in the second embodiment.

Fourth Embodiment

Next, a fourth embodiment will be described based on FIG. 15. Note that the same components in FIG. 15 as those in the first to third embodiments illustrated in FIG. 1 to FIG. 14 are denoted by the same numerals, and duplicating descriptions are omitted.

Figure 15:
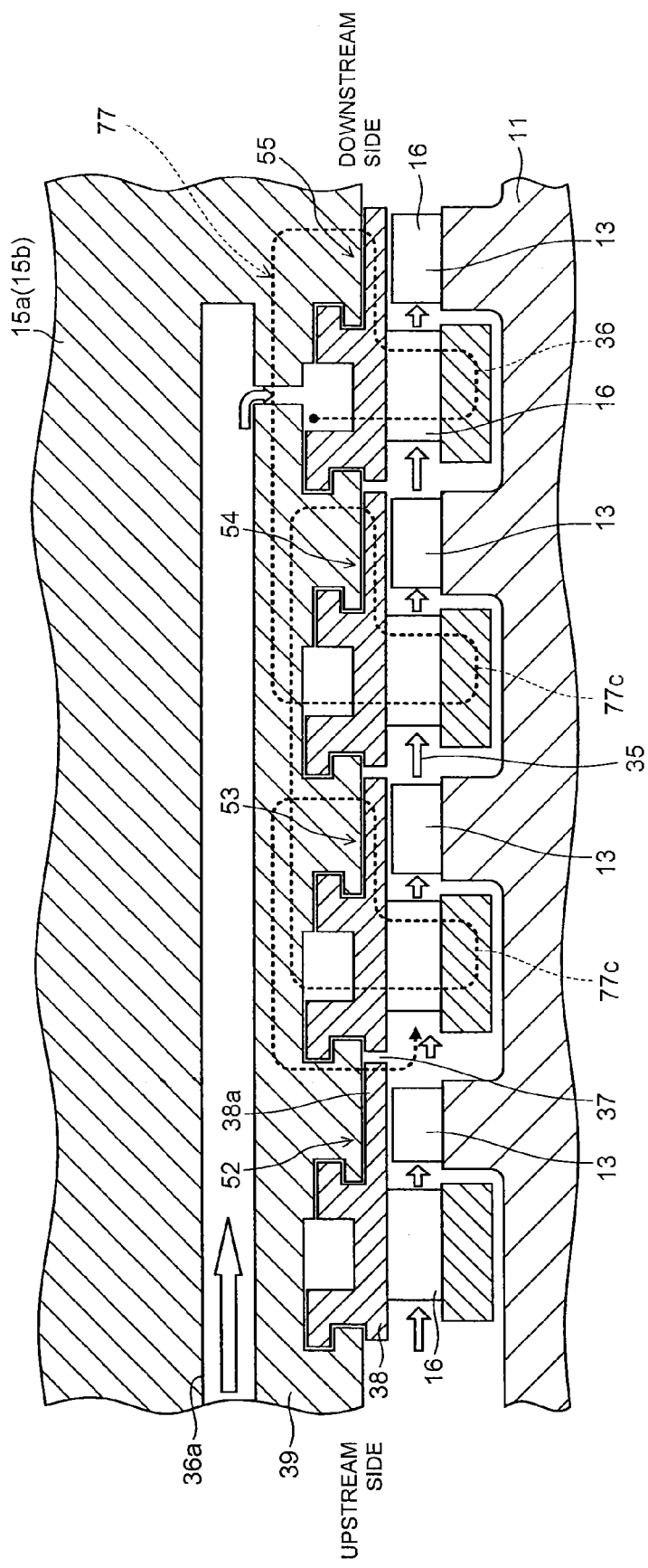
FIG. 15 is a sectional view illustrating a structure at the periphery of a coolant recovery flow path of a $CO_2$ turbine according to a fourth embodiment.

A $CO_2$ turbine in this embodiment includes a coolant recovery flow path 77 in place of the coolant recovery flow path 37 in the first embodiment as illustrated in FIG. 15. The coolant recovery flow path 77 has a stator blade (nozzle) re-cooling flow path 77c. The stator blade re-cooling flow path 77c recovers the coolant at a turbine stage (for example, a fifth turbine stage 55) on the downstream side of a predetermined turbine stage (for example, a third turbine stage 53).

The stator blade re-cooling flow path 77c allows the recovered coolant to go through the inside of a nozzle (stator blade) 16 at the predetermined turbine stage and then transports the coolant toward a turbine stage (for example, the downstream side of a second turbine stage 52) on the upstream side of the predetermined turbine stage.

More specifically, the stator blade re-cooling flow path 77c is provided also at a turbine stage (for example, a fourth turbine stage 54) preceding to the turbine stage at which the coolant has been recovered. In other words, the stator blade re-cooling flow path 77c is a flow path for cooling the nozzle (stator blade) 16 at a preceding turbine stage in order from a subsequent turbine stage before merging with a working fluid transport flow path 35.

Consequently, according to the $CO_2$ turbine in this embodiment, it is possible to improve the cooling performance with respect to the nozzle 16 as well as to effectively utilize the coolant as working fluid.

According to the embodiments described above, the energy efficiency can be increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A turbine using $CO_2$ as working fluid and coolant, comprising:
   a rotor;
   a plurality of moving blades arranged along an axis of the rotor;
   a plurality of stator blades constituting a plurality of turbine stages together with the plurality of moving blades;
   a working fluid transport flow path configured to transport the working fluid sequentially to the plurality of turbine stages;
   a coolant transport flow path configured to transport the coolant by allowing the coolant to sequentially pass through the inside of the plurality of stator blades from an upstream to a downstream of the working fluid;
   a plurality of holding members configured to hold the plurality of stator blades respectively, the holding members having a gap between each other;
   a pair of seal plates connecting the plurality of holding members and facing each other to seal the gap from a predetermined direction; and
   a coolant recovery flow path passing through the gap surrounded by the holding members and the seal plates, the coolant recovery being configured to recover the coolant passing through the inside of the stator blade at a predetermined turbine stage and merge the recovered coolant with the working fluid transport flow path at a turbine stage on an upstream side of the predetermined turbine stage.

* * * * *